(12) United States Patent
Piper et al.

(10) Patent No.: US 11,197,524 B1
(45) Date of Patent: Dec. 14, 2021

(54) CASE FOR PORTABLE ELECTRONIC COMPUTING DEVICE

(71) Applicant: Pioneer Square Brands, Inc., Seattle, WA (US)

(72) Inventors: Brian Lewis Piper, Seattle, WA (US); Jaimie Emerald Chan, Renton, WA (US)

(73) Assignee: PIONEER SQUARE BRANDS, INC., McLean, VA (US)

( * ) Notice: Subject to any disclaimer, the term of this patent is extended or adjusted under 35 U.S.C. 154(b) by 0 days.

(21) Appl. No.: 17/376,443

(22) Filed: Jul. 15, 2021

(51) Int. Cl.
*A45C 11/00* (2006.01)
*H04B 1/3888* (2015.01)
*A45C 13/10* (2006.01)

(52) U.S. Cl.
CPC .......... *A45C 11/00* (2013.01); *A45C 13/1084* (2013.01); *H04B 1/3888* (2013.01); *A45C 2011/003* (2013.01)

(58) Field of Classification Search
CPC .............. A45C 11/00; A45C 2011/003; A45C 2011/002; A45C 2013/025; A45C 13/002; A45C 13/10; A45C 13/1084
See application file for complete search history.

(56) References Cited

U.S. PATENT DOCUMENTS

| | | | |
|---|---|---|---|
| 2007/0232109 A1* | 10/2007 | Parker | A45C 5/03 439/326 |
| 2014/0104488 A1* | 4/2014 | Samuels | H04N 5/2252 348/374 |

* cited by examiner

*Primary Examiner* — Keith Ferguson
(74) *Attorney, Agent, or Firm* — Grandview Law

(57) ABSTRACT

Systems and methods are involved with a tablet case assembly including a lid portion, a restraint projection extending from the lid portion, a container portion hingedly coupled with the lid portion, and a holder projection extending from the container portion. When the lid portion is in an open position, the holder projection is uncoupled from the restraint projection. When the lid portion is in a closed position, the holder projection is coupled with the restraint projection to secure the lid portion in the closed position and to form an elongated open-ended enclosure bounded by a front side of the container portion, the restraint projection, and the holder projection. In addition, other aspects are described in the claims, drawings, and text forming a part of the present disclosure.

18 Claims, 15 Drawing Sheets

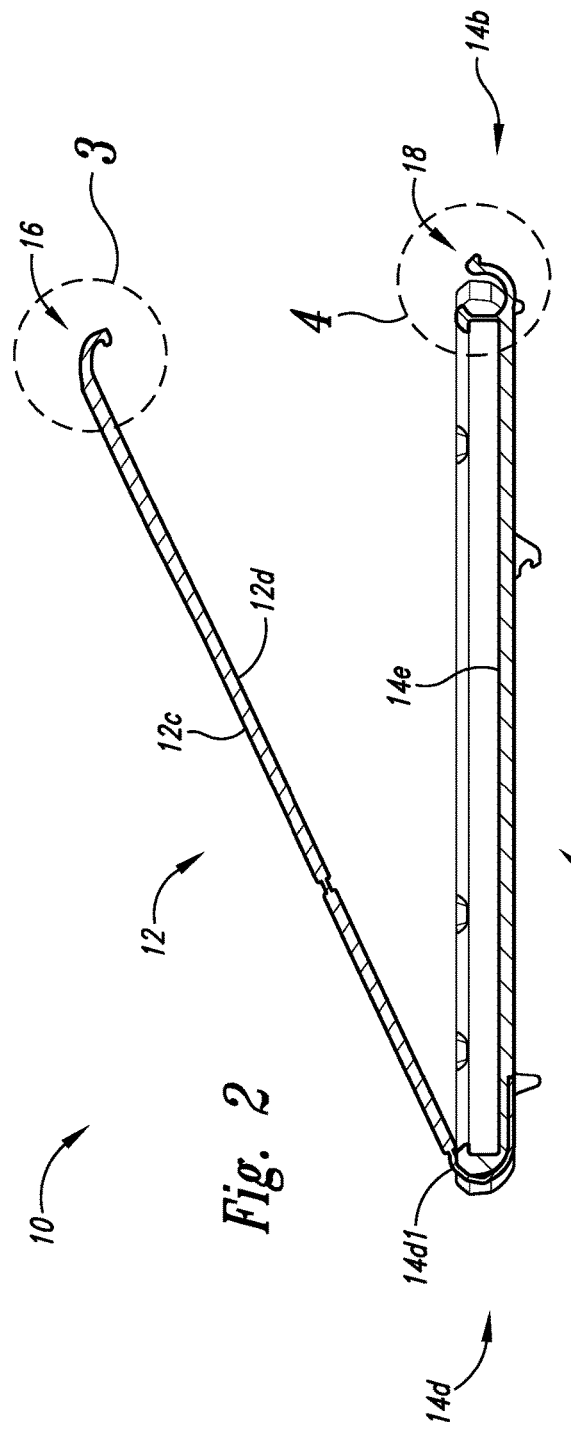
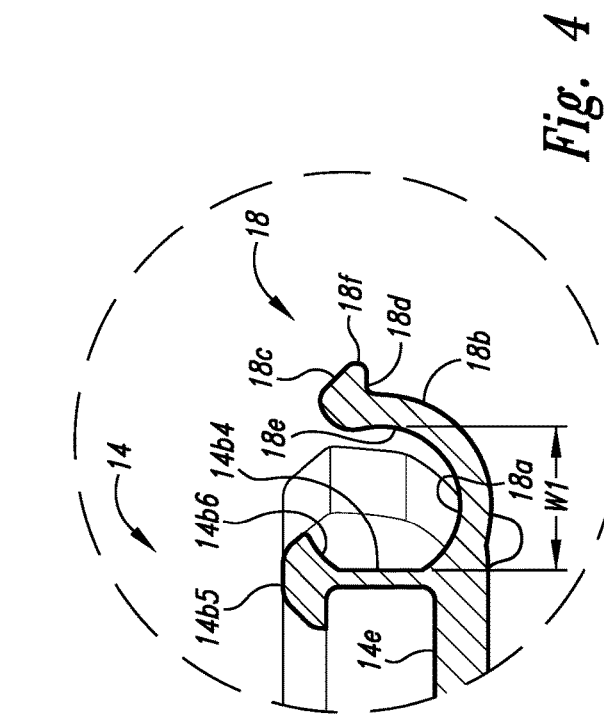
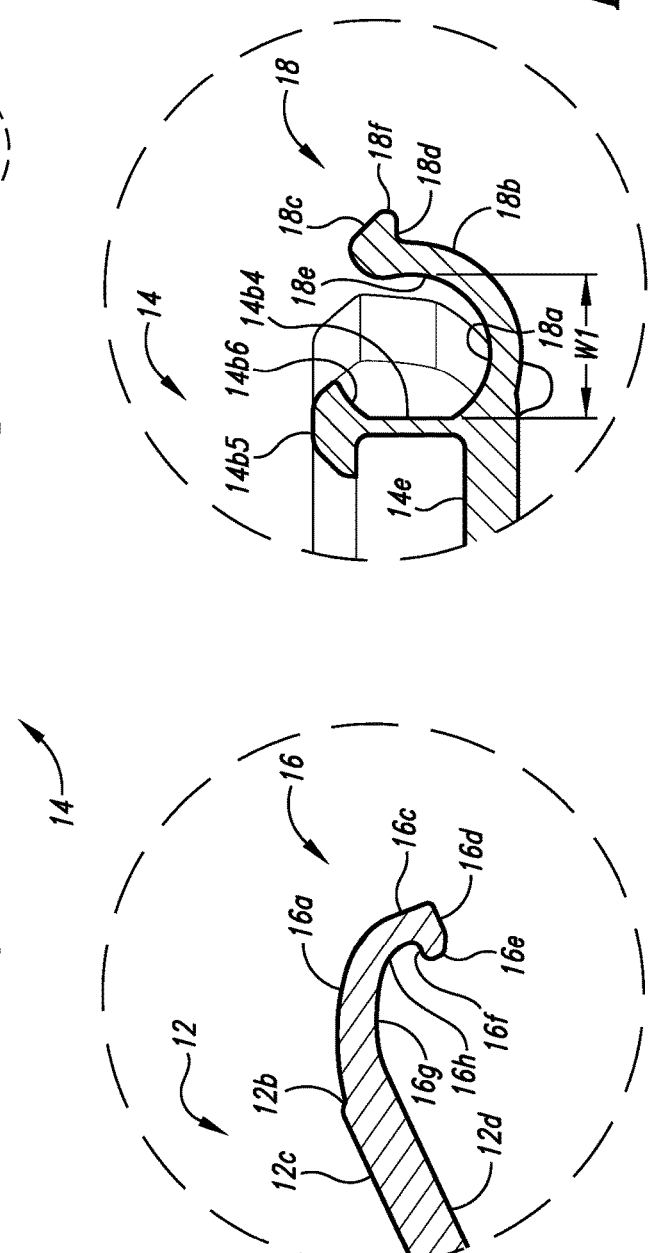
Fig. 2
Fig. 3
Fig. 4

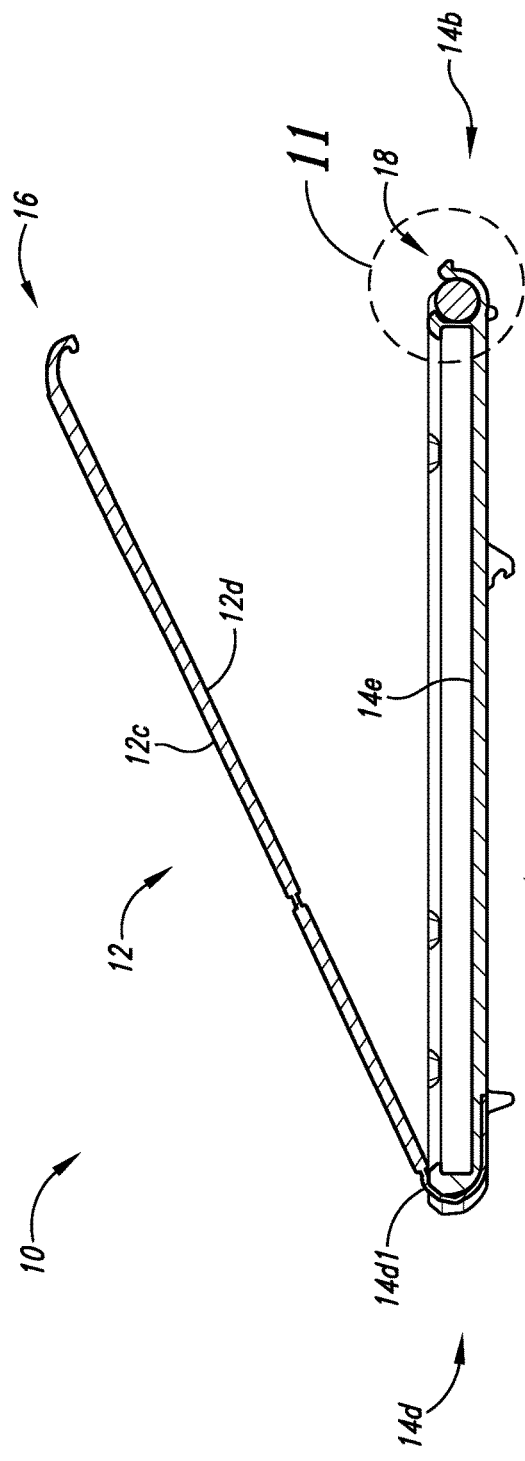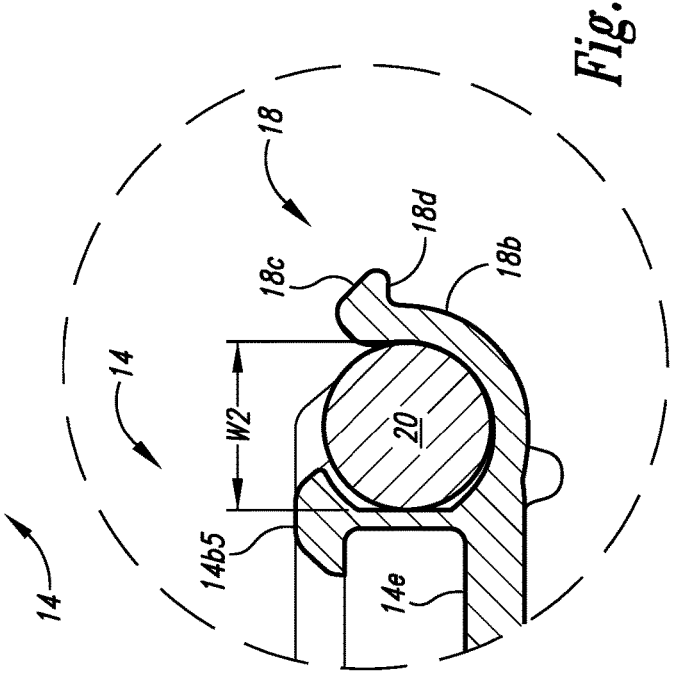
Fig. 10
Fig. 11

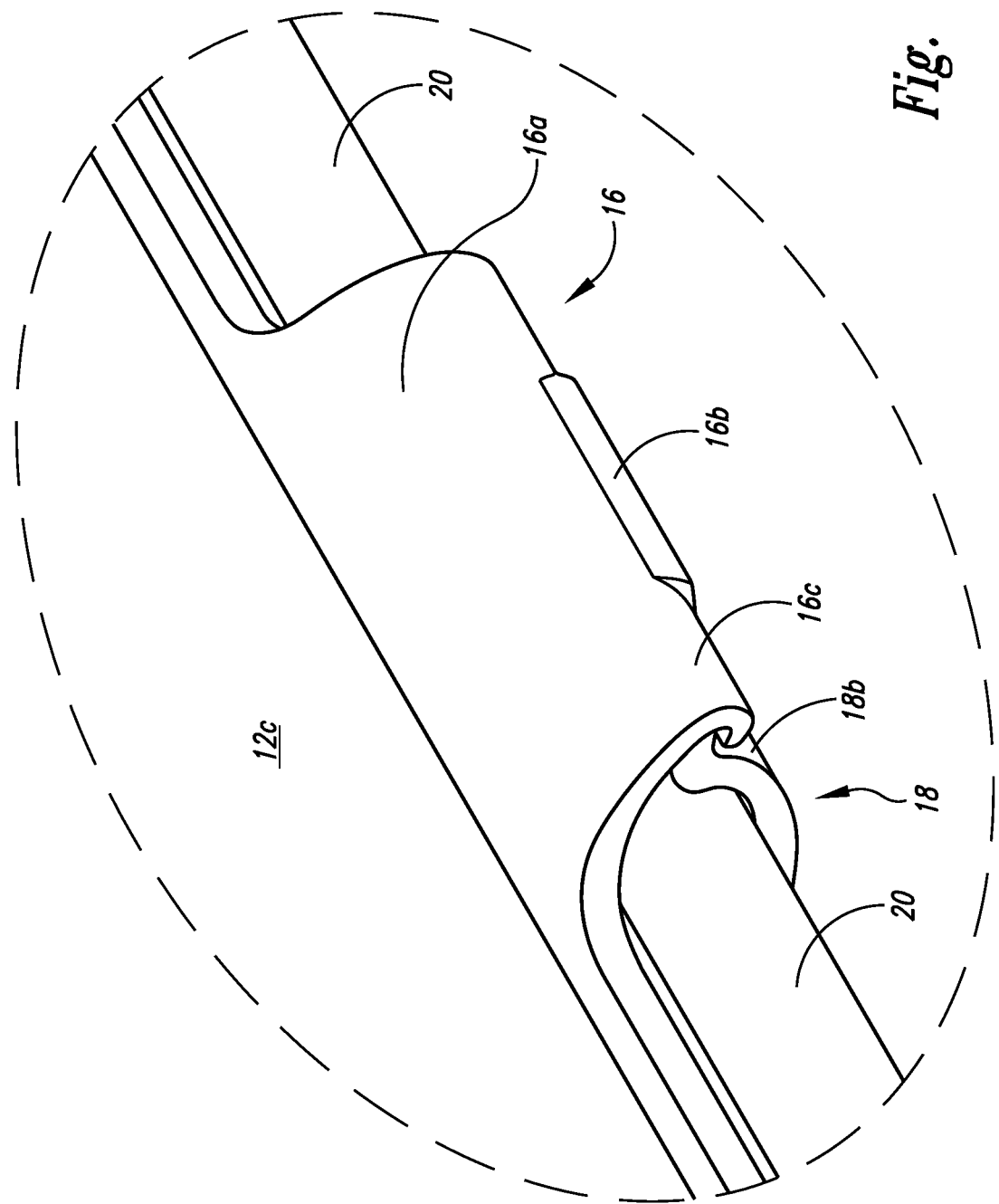

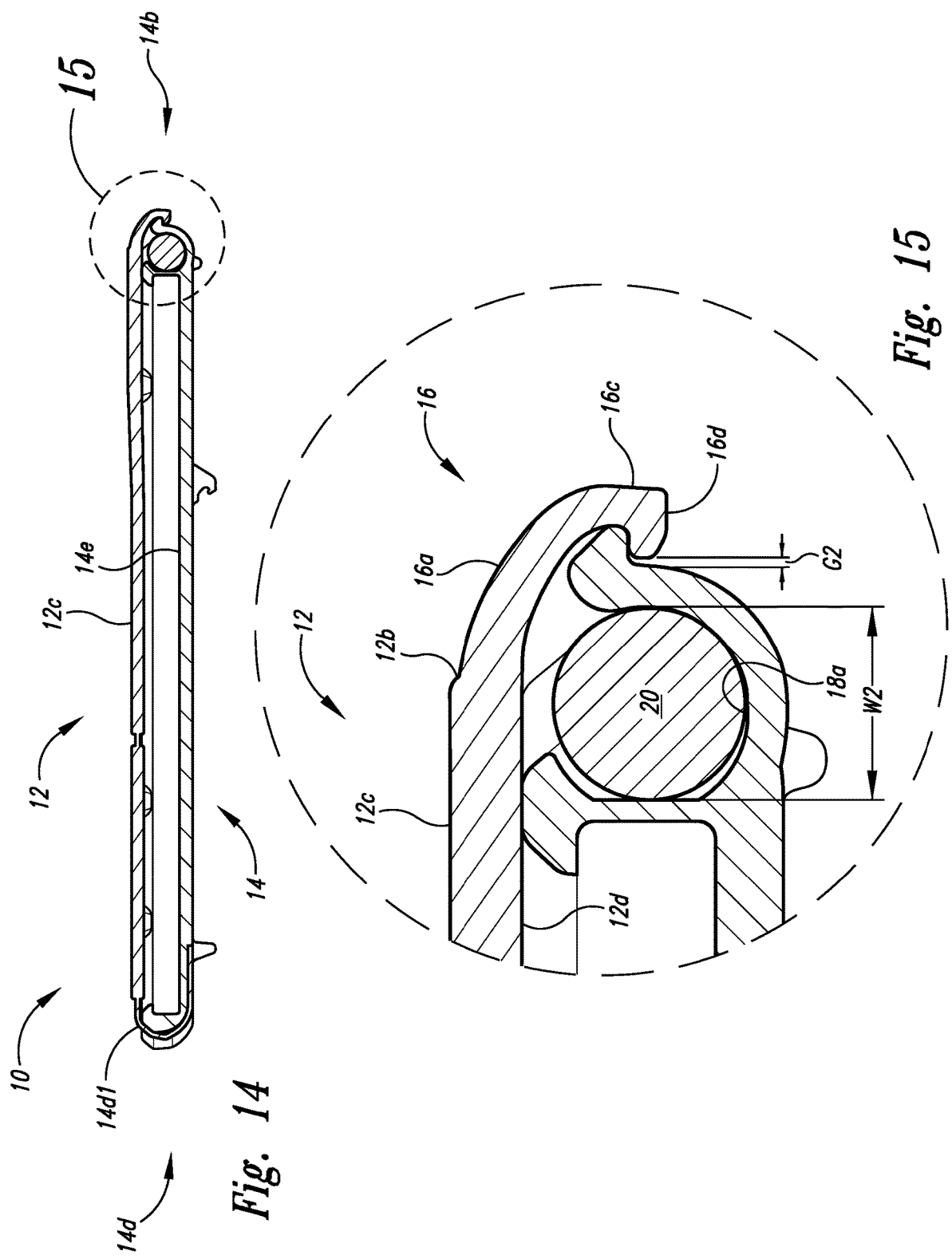

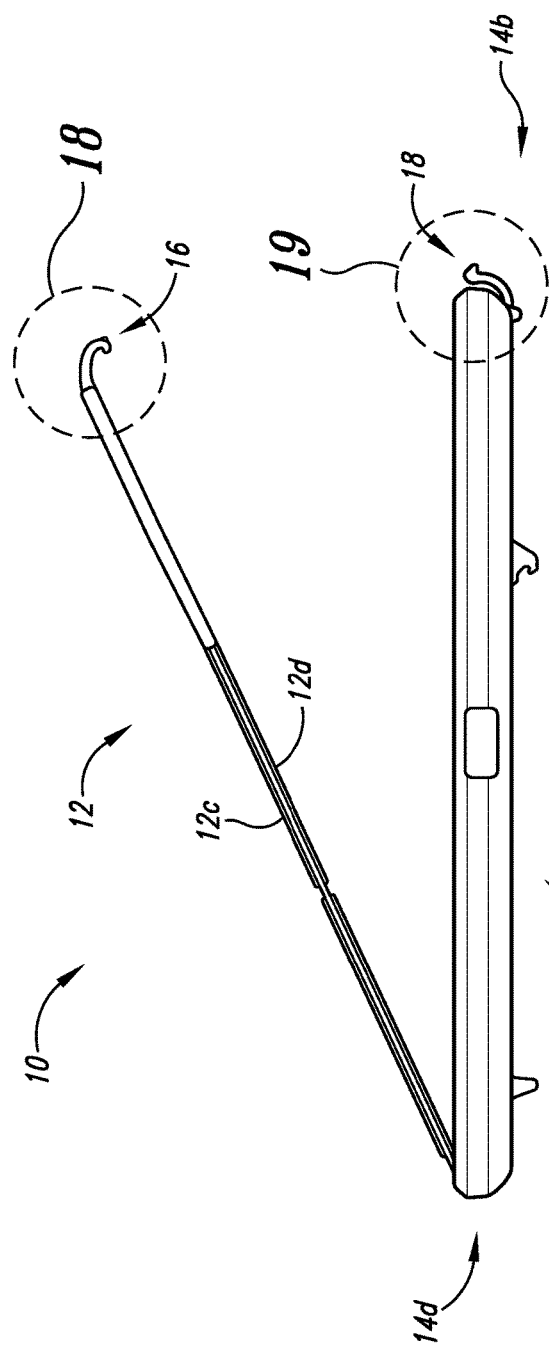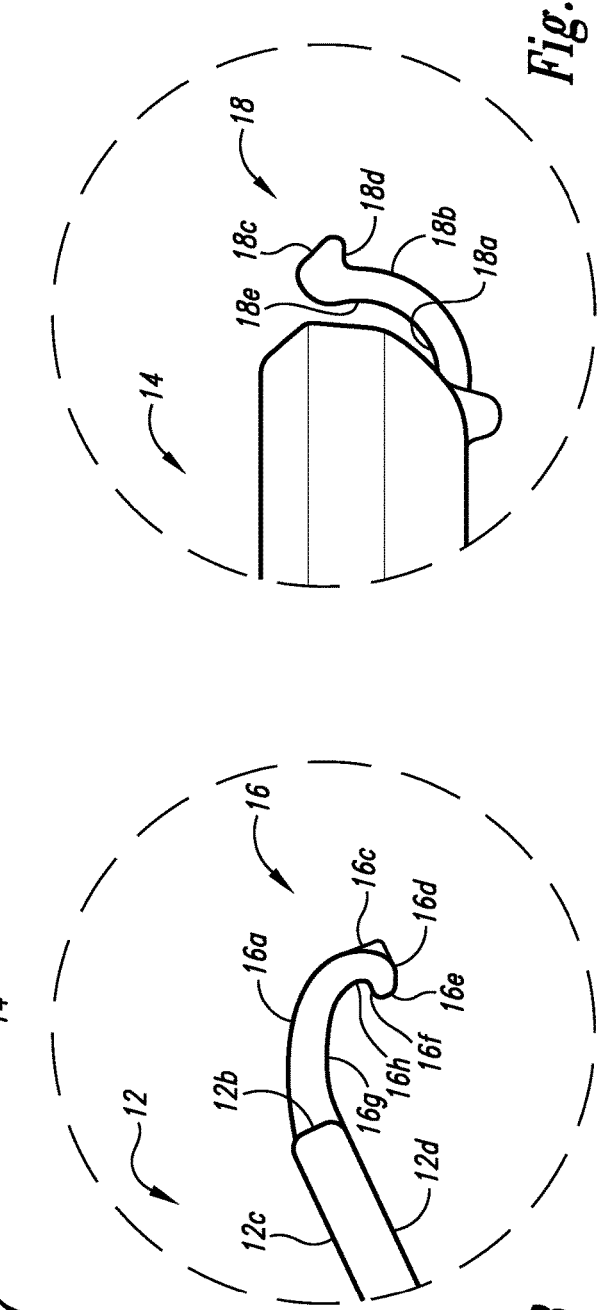
Fig. 17
Fig. 18
Fig. 19

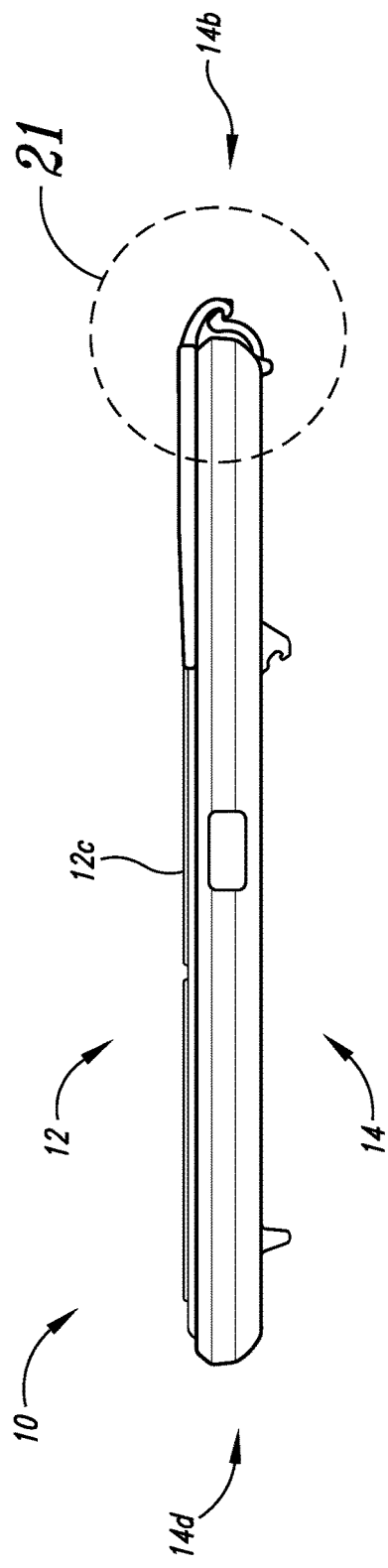
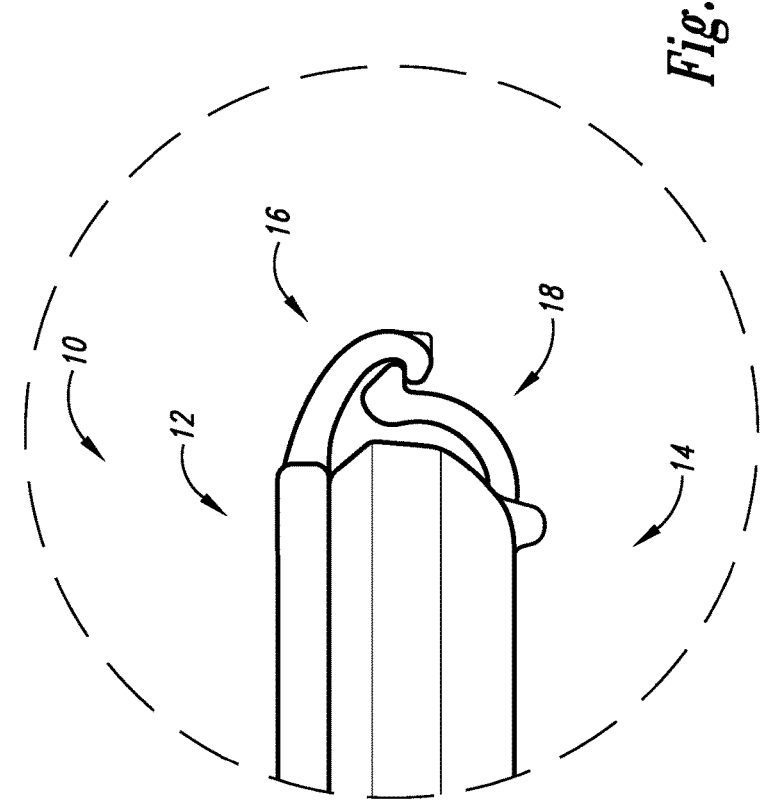
Fig. 20
Fig. 21

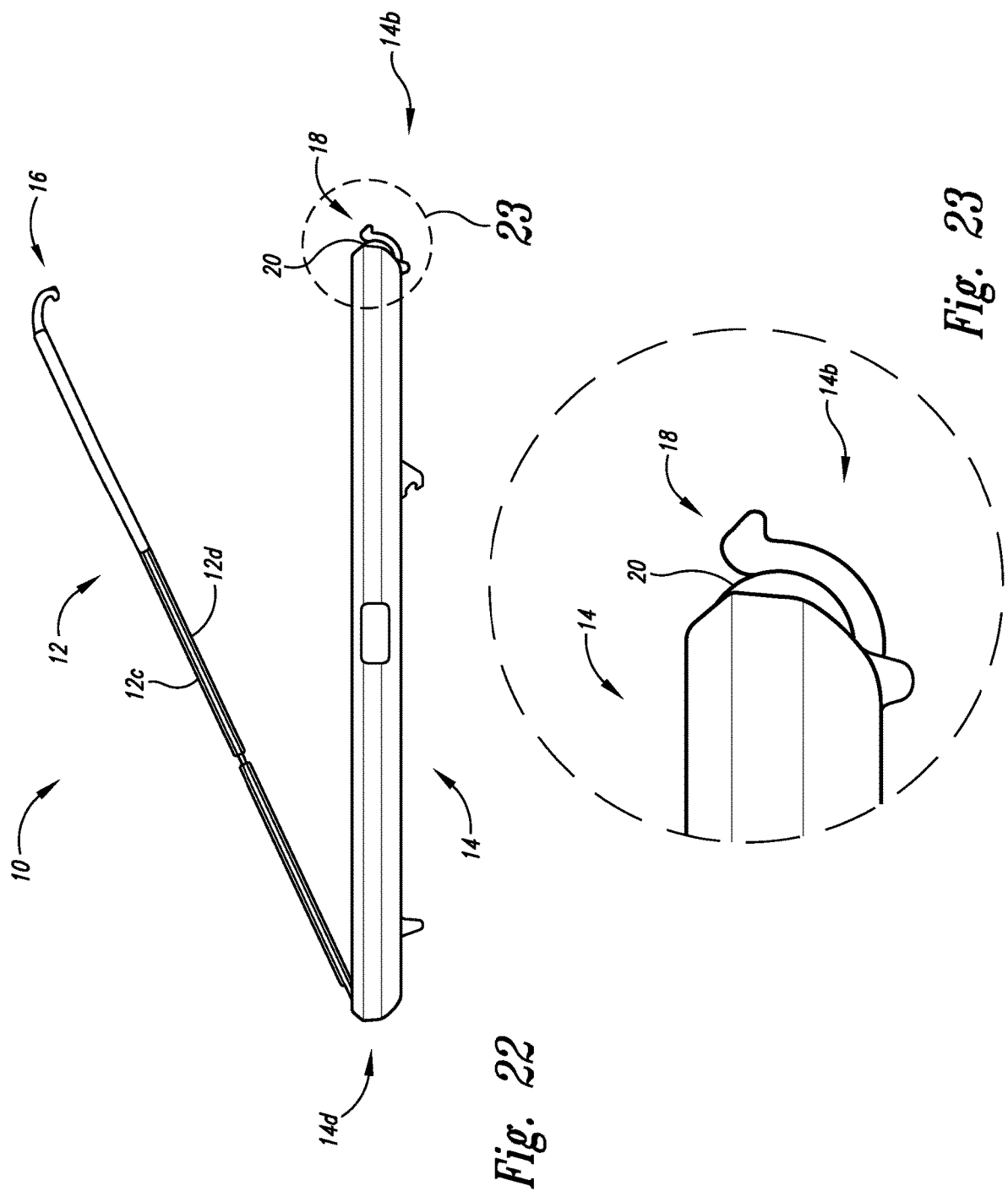

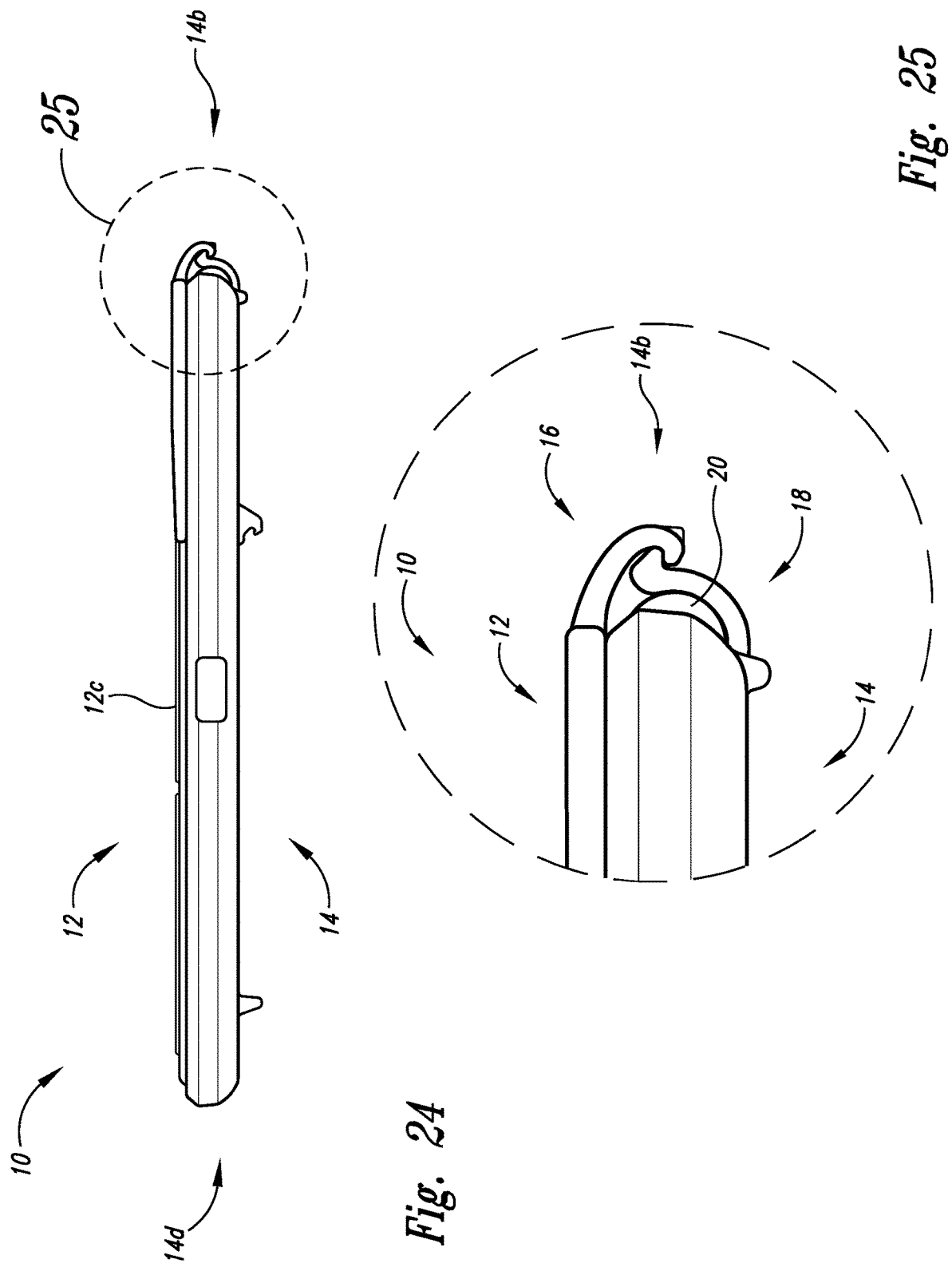

CASE FOR PORTABLE ELECTRONIC COMPUTING DEVICE

SUMMARY

In one or more aspects, a system can include a tablet case assembly including (I) a lid portion including a front edge; (II) a restraint projection extending from the front edge of the lid portion; (III) a container portion hingedly coupled with the lid portion to provide a closed position and at least one open position for the lid portion, the container portion including a front side; and (IV) a holder projection extending outwardly away from the front side of the container portion, wherein (A) when the lid portion is in the at least one open position, the holder projection is uncoupled from the restraint projection, and (B) when the lid portion is in the closed position, the holder projection is coupled with the restraint projection to secure the lid portion in the closed position and to form an elongated open-ended enclosure bounded by the front side of the container portion, the restraint projection, and the holder projection. The holder projection can couple and uncouple with the restraint projection through a clasping action. The holder projection and the restraint projection can be semiflexible to allow for coupling together. The holder projection can include a ledge portion, a curb portion, and a tip portion. The ledge portion can extend outwardly away from the front side of the container portion. The curb portion can extend from the ledge portion opposingly positioned across from the front side of the container portion. The tip portion can include an exterior surface extending outwardly away from the curb portion in a direction away from the front side. Wherein (i) the restraint projection can include a first exterior curvilinear surface, a second exterior curvilinear surface, and an end tip with a projection having an interior end tip surface, (ii) the first exterior curvilinear surface can extend outwardly away from the front edge of the lid portion, (iii) the second exterior curvilinear surface can extend from the first exterior curvilinear surface to be angularly positioned relative to the first exterior curvilinear surface, (iv) the end tip can extend from the second exterior curvilinear surface, and (v) the interior end tip surface of the projection of the end tip can extend away from the second exterior curvilinear surface. Wherein (i) when the holder projection and the restraint projection are coupled together, (a) the interior end tip surface of the projection of the end tip of the restraint projection can be contacting the exterior surface of the tip portion of the holder projection. Wherein (i) when (a) the holder projection and the restraint projection are coupled together, and (b) without an elongated member being coupled with the holder projection, a portion of the curb portion of the holder projection can be spaced from the projection of the end tip of the restraint projection a first gap distance, (ii) when (a) the holder projection and the restraint projection are coupled together, and (b) with the elongated member being coupled with the holder projection, the portion of the curb portion of the holder projection can be spaced from the projection of the end tip of the restraint projection the second gap distance, and the first gap distance can be greater than the second gap distance. Wherein (i) the tip portion of the holder projection can include an exterior tip face portion, (ii) the end tip of the restraint projection can include an interior backwall surface, (iii) when (a) the holder projection and the restraint projection are coupled together, and (b) without an elongated member being coupled with the holder projection, (i) the exterior tip face portion of the tip portion of the holder projection is spaced from the interior backwall surface of the end tip of the restraint projection a third gap distance being nonzero, and (iv) when (a) the holder projection and the restraint projection are coupled together, and (b) with the elongated member being coupled with the holder projection, (i) the exterior tip face portion of the tip portion of the holder projection can physically contact the interior backwall surface of the end tip of the restraint projection a third gap distance. Wherein (i) a gap between a portion of the front side of the container portion and a portion of the holder projection can have a first width when the front side of the container portion and the holder projection are uncoupled from an elongated member, and (ii) the gap can have a second width when the front side of the container portion and the holder projection are coupled with the elongated member, (iii) the second width can be greater than the first width. Wherein (i) when the holder projection is coupled with the restraint projection and when the holder projection is coupled with an elongated member, (a) a portion of the holder projection can be touching a portion of the restraint projection, and wherein (ii) when the holder projection is coupled with the restraint projection and when the holder projection is uncoupled from the elongated member, (a) the portion of the holder projection can be spaced from the portion of the restraint projection. Wherein a gap between a portion of the front side of the container portion and a portion of the holder projection can have a first width, the holder projection can be semiflexible to expand the gap a second width to couple with an elongated member having the second width. Wherein a gap between a portion of the front side of the container portion and a portion of the holder projection can have a first diameter, the holder projection can be semiflexible to expand the gap to a second diameter to couple with an elongated member of the second width. Wherein a gap between a portion of the front side of the container portion and a portion of the holder projection can have a first span size, the holder projection can be semiflexible to expand the gap to a second span size to couple with an elongated member having the second width. Wherein the holder projection can be semiflexible to expand the gap to the second span size to couple with the elongated member as a stylus. Wherein the front side of the container portion can include an elongated recess having a recess length and wherein when the front side of the container portion and the holder projection are coupled with an elongated member, the widest portion of the elongated member can have a second length less than or equal to the recess length. Wherein the front side of the container portion can include an elongated recess wherein its deepest portion can have a recess length to at least partially removably couple with an elongated member having a second length less than or equal to the recess length. Wherein the front side of the container portion can further include at least one tapered portion extending from the elongated recess to couple with at least one tapered portion of the elongated member. Wherein the restraint projection can be molded with the lid portion and wherein the holder projection can be molded with the container portion.

In one or more aspects a system can include a tablet case assembly including (I) a lid portion including a front edge; (II) a restraint projection extending from the front edge of the lid portion; (III) a container portion hingedly coupled with the lid portion to provide a closed position and at least one open position for the lid portion, the container portion including a front side; (IV) a holder projection extending outwardly away from the front side of the container portion; and (V) an elongated member, wherein (A) a gap between a portion of the front side of the container portion and a portion of the holder projection can have a first width, the holder projection being semiflexible to expand the gap a second width to couple with the elongated member, portions of the elongated member having the second width, (B) when the lid portion is in the at least one open position, the holder projection can be uncoupled from the restraint projection, and (C) when the lid portion is in the closed position, the holder projection can be coupled with the restraint projection to secure the lid portion in the closed position and to form an elongated open-ended enclosure bounded by the front side of the container portion, the restraint projection, and the holder projection.

In one or more aspects a system can include a tablet case assembly including (I) a lid portion including a front edge; (II) a restraint projection extending from the front edge of the lid portion; (III) a container portion hingedly coupled with the lid portion to provide a closed position and at least one open position for the lid portion, the container portion including a front side; (IV) a holder projection extending outwardly away from the front side of the container portion; and (V) an elongated member, wherein (A) a gap between a portion of the front side of the container portion and a portion of the holder projection has a first width, the holder projection being semiflexible to expand the gap a second width to removably couple with the elongated member, portions of the elongated member having the second width, (B) when the lid portion is in the at least one open position, the holder projection is uncoupled from the restraint projection, and (C) when the lid portion is in the closed position, the holder projection is coupled with the restraint projection to secure the lid portion in the closed position when the elongated member is coupled with the gap and when the elongated member is uncoupled from the gap.

In addition to the foregoing, other aspects are described in the claims, drawings, and text forming a part of the disclosure set forth herein. Various other aspects are set forth and described in the teachings such as text (e.g., claims and/or detailed description) and/or drawings of the present disclosure. The foregoing is a summary and thus may contain simplifications, generalizations, inclusions, or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

For a more complete understanding of implementations, reference now is made to the following descriptions taken in connection with the accompanying drawings. The use of the same symbols in different drawings typically indicates similar or identical items, unless context dictates otherwise.

With reference now to the figures, shown are one or more examples of a Case for Portable Electronic Computing Device systems, articles of manufacture, compositions of matter for same that may provide context, for instance, in introducing one or more processes and/or devices described herein.

FIG. 2 is a cross-sectional side-elevational view of the case assembly taken along the 2-2 cut line of FIG. 1.

FIG. 3 is an enlarged side elevational view of a dashed-circle portion of the case assembly labeled "3" shown in FIG. 2.

FIG. 4 is an enlarged side elevational view of a dashed-circle portion of the case assembly labeled "4" shown in FIG. 2.

FIG. 10 is a cross-sectional side-elevational view of the case assembly taken along the 10-10 cut line of FIG. 9.

FIG. 11 is an enlarged side elevational view of a dashed-circle portion of the case assembly labeled "11" shown in FIG. 10.

FIG. 13 is an enlarged side-elevational view of a dashed-circle portion of the case assembly label "13" shown in FIG. 12.

FIG. 14 is a cross-sectional side-elevational view of the case assembly taken along the 14-14 cut line of FIG. 12.

FIG. 15 is an enlarged side elevational view of a dashed-circle portion of the case assembly labeled "15" shown in FIG. 14.

FIG. 17 is a side elevational view of the case assembly for the portable electronic computing device of FIG. 1 with case assembly cover closed.

FIG. 18 is an enlarged side elevational view of a dashed-circle portion of the case assembly labeled "18" shown in FIG. 17.

FIG. 19 is an enlarged side elevational view of a dashed-circle portion of the case assembly labeled "19" shown in FIG. 17.

FIG. 20 is a side elevational view of the case assembly for a portable electronic computing device of FIG. 1 with case assembly cover closed.

FIG. 21 is an enlarged side elevational view of a dashed-circle portion labeled "21" shown in FIG. 20.

FIG. 22 is a side elevational view of the case assembly for the portable electronic computing device of FIG. 1 with case assembly cover closed shown holding a stylus.

FIG. 23 is an enlarged side elevational view of a dashed-circle portion of the case assembly labeled "23" shown in FIG. 22.

FIG. 24 is a side elevational view of the case assembly for a portable electronic computing device of FIG. 1 with case assembly cover closed shown holding a stylus.

FIG. 25 is an enlarged side elevational view of a dashed-circle portion of the case assembly labeled "25" shown in FIG. 24.

DETAILED DESCRIPTION

Figure 1:
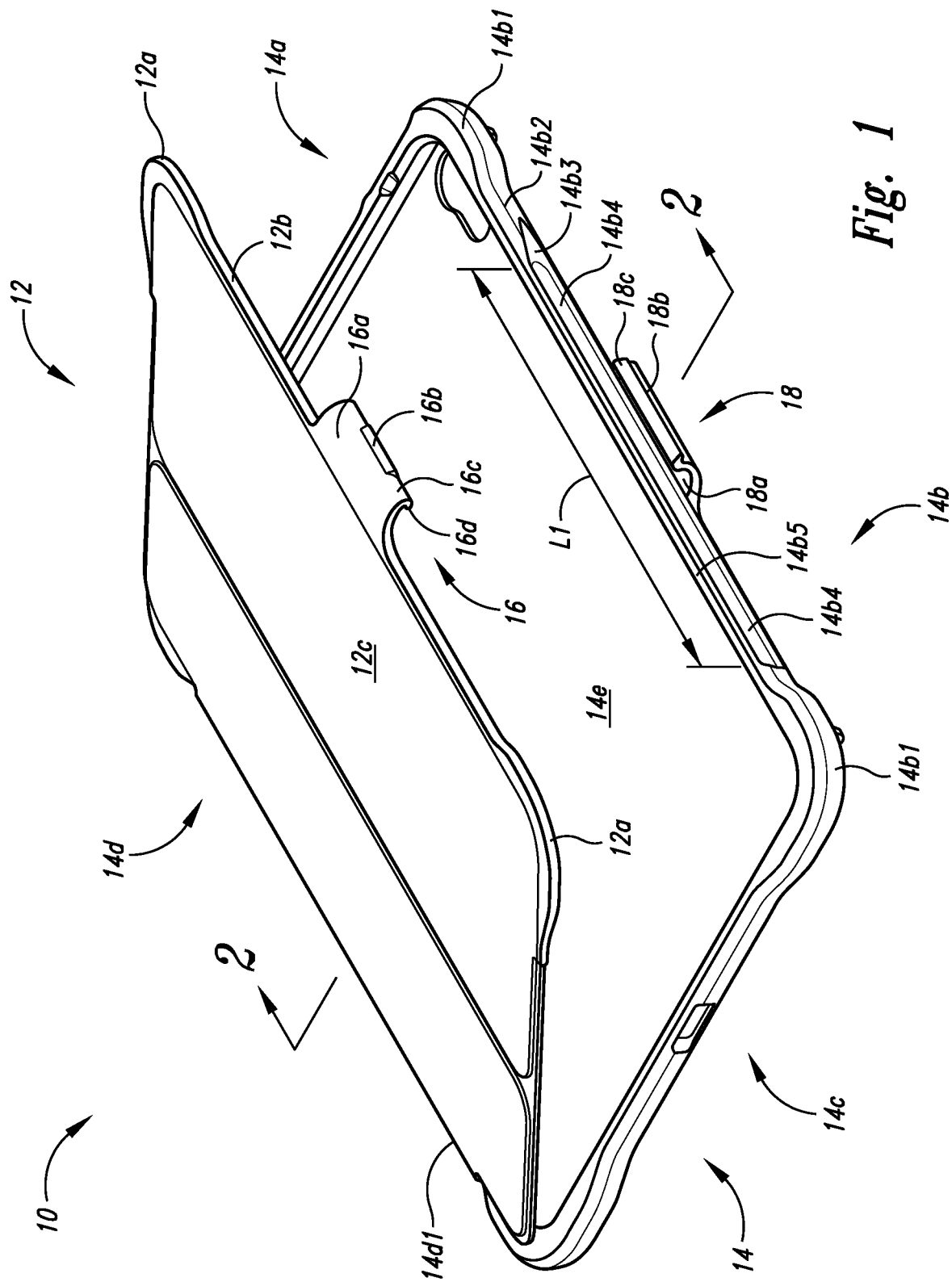
FIG. 1 is an anterior perspective view of a case assembly for a portable electronic computing device with case assembly cover open.

In the following detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here.

Turning to FIG. 1, depicted therein is an anterior perspective view of tablet case assembly 10 for a conventional tablet-shaped portable electronic computing device (not shown). The tablet case assembly 10 is shown to include lid portion 12 (shown in an open position) and container portion 14 hingedly coupled thereto. The lid portion 12 is shown to include corners 12a, front edge 12b extending therebetween, and outer surface 12c. The container portion 14 is shown to include right side 14a, front side 14b, left side 14c, back side 14d, and container back 14e. Furthermore, front side 14b is shown to include corner 14b1, front edge 14b2, taper 14b3, elongated recess 14b4 including recess length L1, and top edge 14b5. The back side 14d is shown to include hinge 14d1 (e.g., various hinge implementations such as integral hinge, living hinge, flexible hinge, and hardware-oriented hinge) through which the lid portion 12 is hingedly coupled to the container portion 14.

The tablet case assembly 10 is shown to also include restraint projection 16 extending from lid portion 12 (in some implementations being produced by being molded together) and holder projection 18 extending from container portion 14 (in some implementations being produced by being molded together). The restraint projection 16 is shown to include first exterior curvilinear surface 16a, outer label edge 16b, second exterior curvilinear surface 16c, and end tip 16d. The holder projection 18 is shown to include ledge portion 18a, curb portion 18b, and tip portion 18c.

Turning to FIG. 2, depicted therein is a cross-sectional side-elevational view of the case assembly taken along the 2-2 cut line of FIG. 1.

Turning to FIG. 3, depicted therein is an enlarged side elevational view of a dashed-circle portion of the case assembly labeled "3" shown in FIG. 2. The lid portion 12 is shown to include inner surface 12d. The restraint projection 16 is shown to include restraint projection 16, projection 16e, interior end tip surface 16f, interior curvilinear surface 16g, and interior backwall surface 16h.

Turning to FIG. 4, depicted therein is an enlarged side elevational view of a dashed-circle portion of the case assembly labeled "4" shown in FIG. 2. The container portion 14 is shown to include top inner surface 14b6. The holder projection 18 is shown to include exterior surface 18d, side receiving surface 18e, and exterior tip face portion 18f. Furthermore, elongated recess 14b4 of front side 14b of container portion 14 is shown to be positioned from curb portion 18b of holder projection 18 first width W1 with no object being coupled between front side 14b of container portion 14 and with curb portion 18b of holder projection 18.

Figure 5:
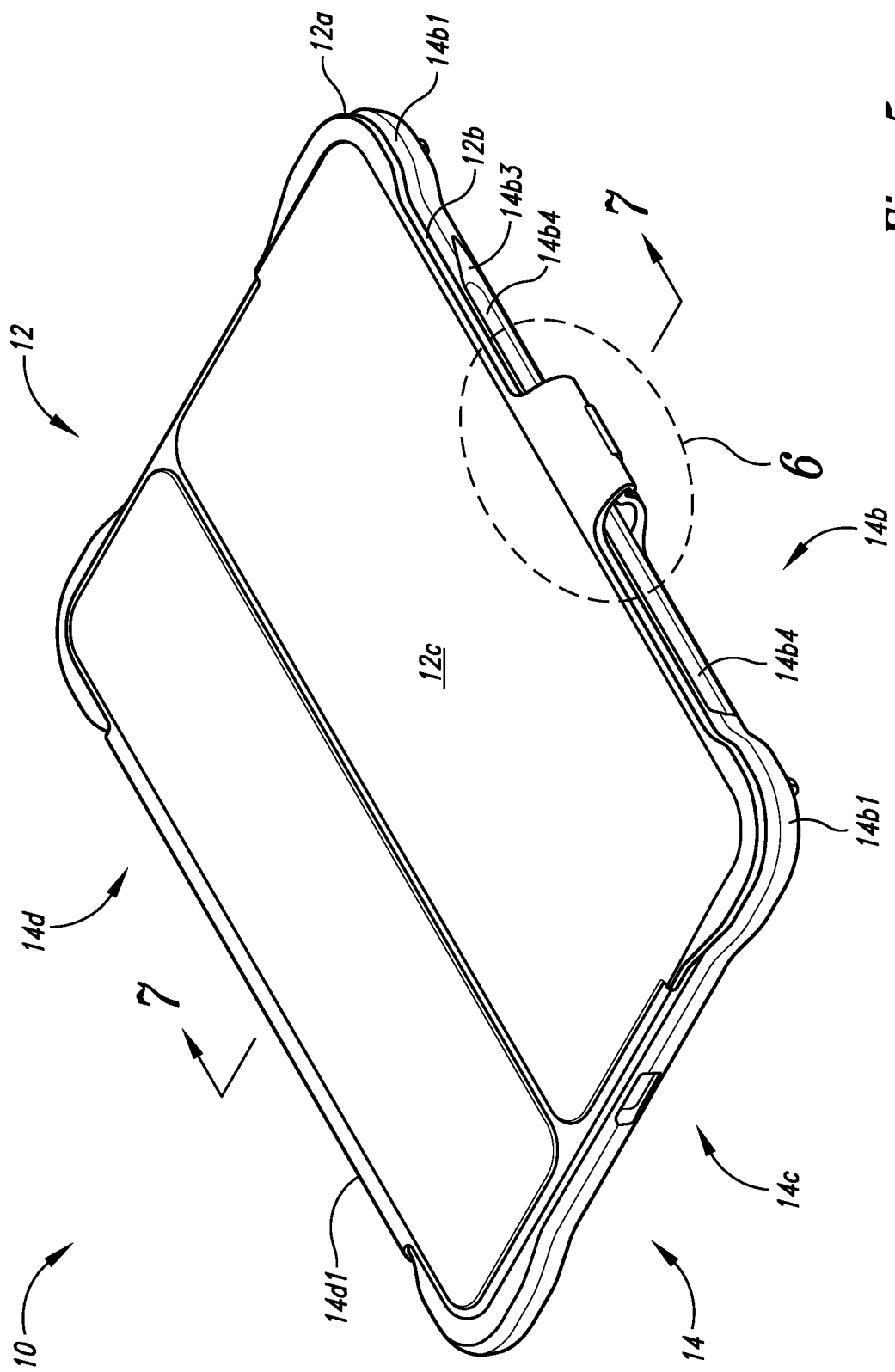
FIG. 5 is an anterior perspective view of a case assembly for the portable electronic computing device of FIG. 1 with case assembly cover closed.

Turning to FIG. 5, depicted therein is an anterior perspective view of a case assembly for the portable electronic computing device of FIG. 1 with case assembly cover closed.

Figure 6:
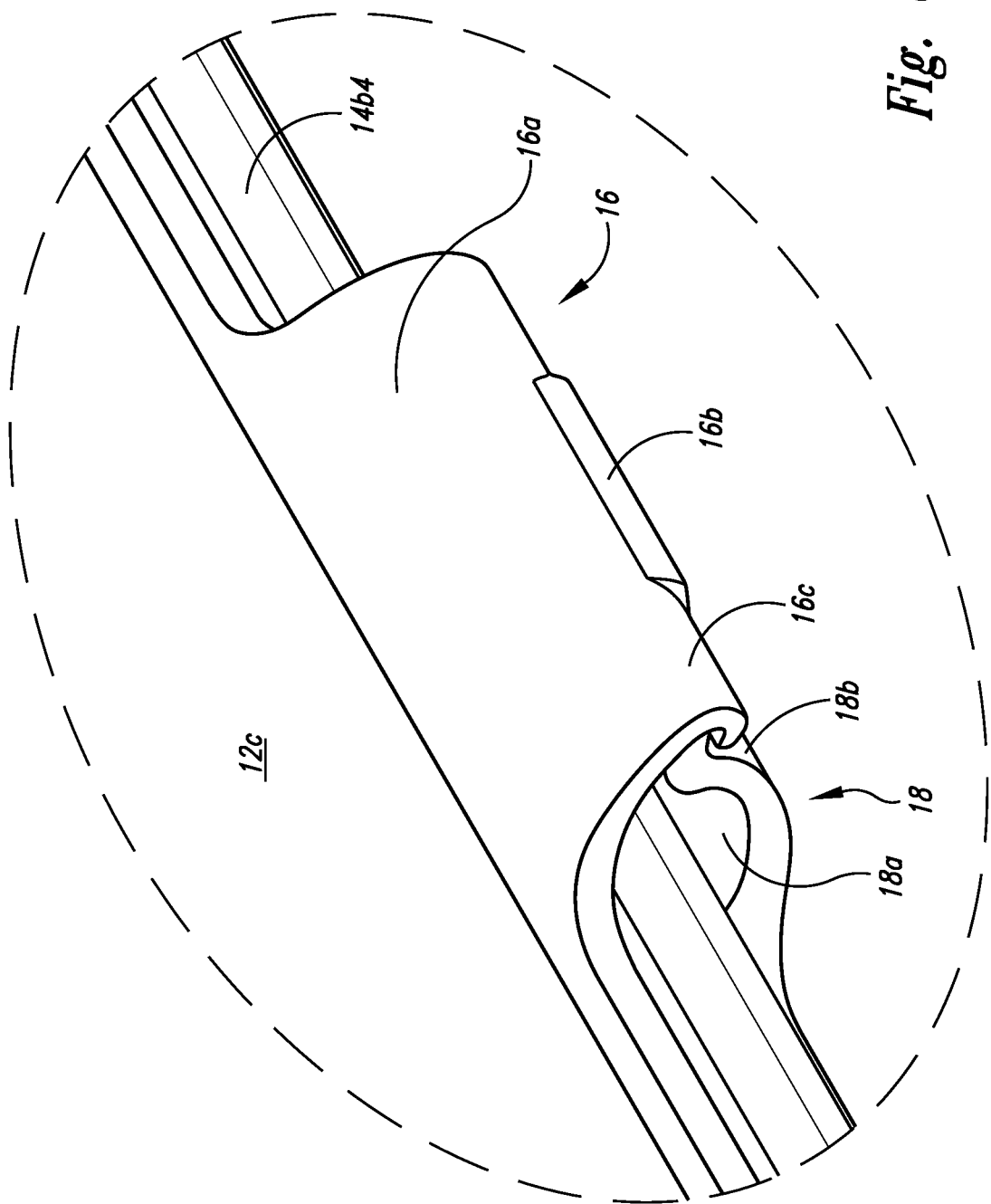
FIG. 6 is an enlarged side elevational view of a dashed-circle portion of the case assembly labeled "6" shown in FIG. 5.

Turning to FIG. 6, depicted therein is an enlarged side elevational view of a dashed-circle portion of the case assembly labeled "6" shown in FIG. 5.

Figure 7:
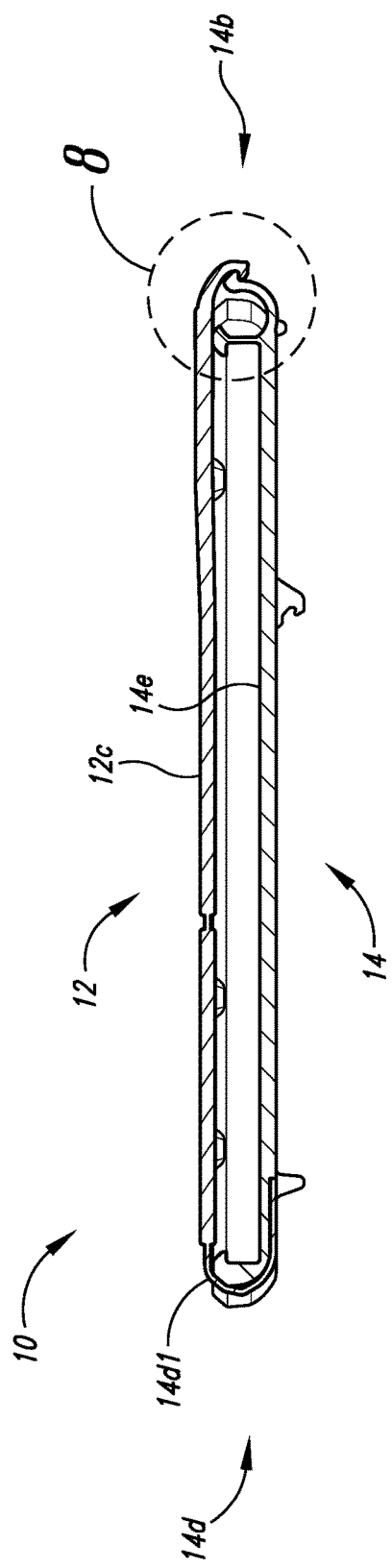
FIG. 7 is a cross-sectional side-elevational view of the case assembly taken along the 7-7 cut line of FIG. 5.

Turning to FIG. 7, depicted therein is a cross-sectional side-elevational view of the case assembly taken along the 7-7 cut line of FIG. 5.

Figure 8:
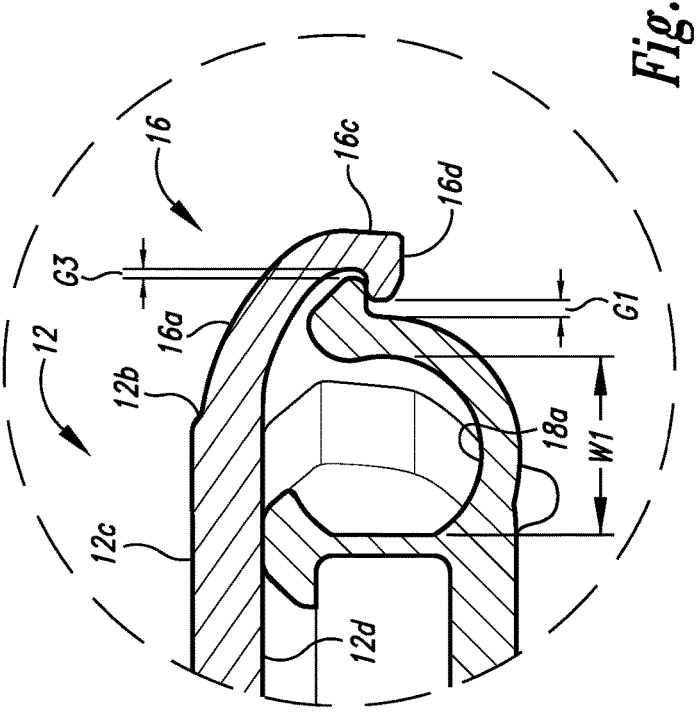
FIG. 8 is an enlarged side elevational view of a dashed-circle portion of the case assembly labeled "8" shown in FIG. 7.

Turning to FIG. 8, depicted therein is an enlarged side elevational view of a dashed-circle portion of the case assembly labeled "8" shown in FIG. 7. The restraint projection 16 is shown coupled with holder projection 18, projection 16e of restraint projection 16 is positioned across first gap distance G1 from curb portion 18b of holder projection 18 and interior backwall surface 16h of restraint projection 16 is positioned across third gap distance G3 from exterior tip face portion 18f of tip portion 18c of holder projection 18 while no object is coupled between elongated recess 14b4 of front side 14b of container portion 14 and side receiving surface 18e of curb portion 18b of holder projection 18.

Figure 9:
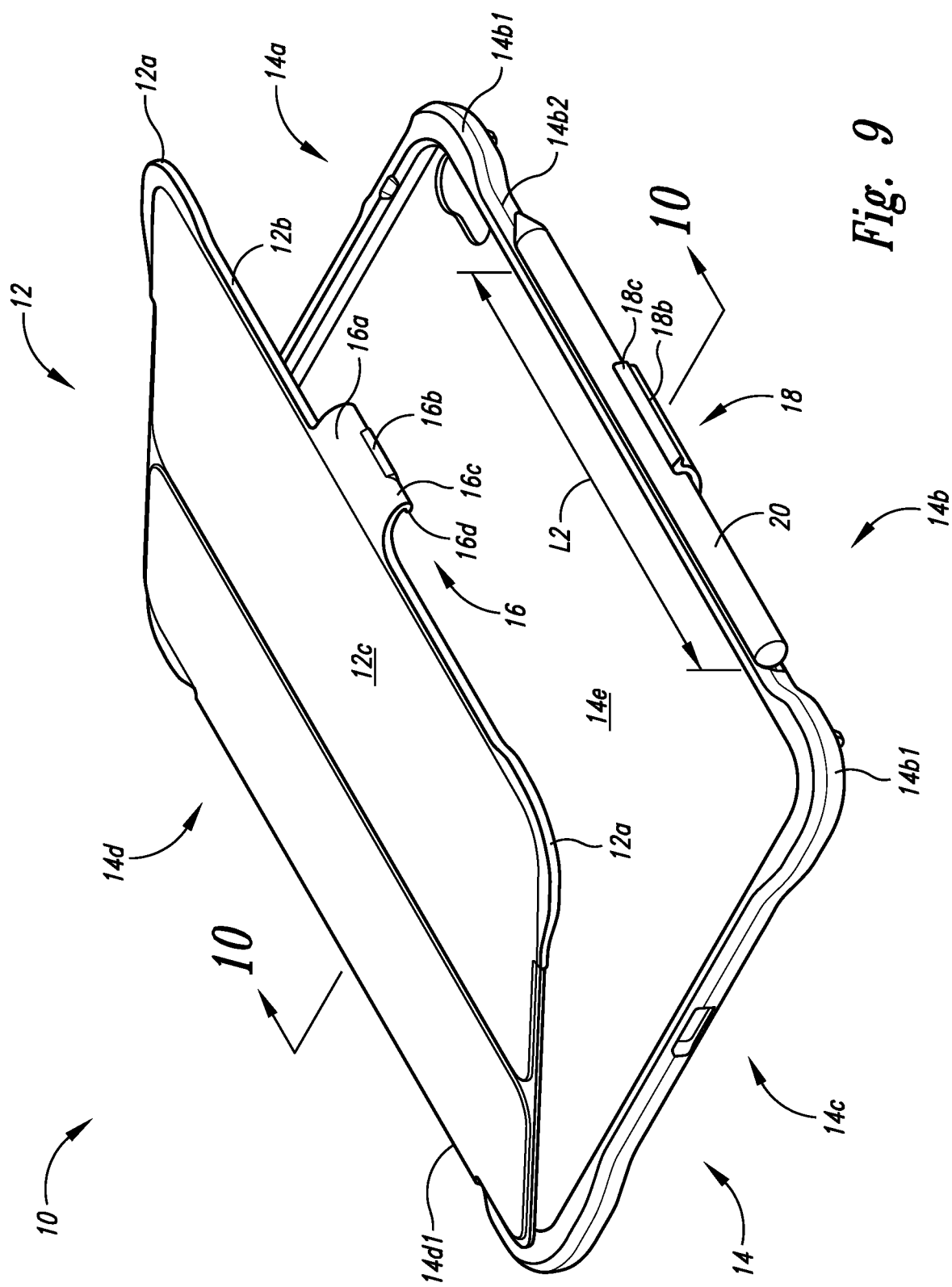
FIG. 9 is an anterior perspective view of a case assembly for a portable electronic computing device with case assembly cover open of FIG. 1 shown holding a stylus.

Turning to FIG. 9, depicted therein is an anterior perspective view of a case assembly for a portable electronic computing device with case assembly cover open of FIG. 1 shown holding a stylus. A stylus 20 with stylus length L2 is shown coupled between elongated recess 14b4 of front side 14b of container portion 14 and side receiving surface 18e of curb portion 18b of holder projection 18.

Turning to FIG. 10, depicted therein is a cross-sectional side-elevational view of the case assembly taken along the 10-10 cut line of FIG. 9.

Turning to FIG. 11, depicted therein is an enlarged side elevational view of a dashed-circle portion of the case assembly labeled "11" shown in FIG. 10. The elongated recess 14b4 of front side 14b of container portion 14 is shown to be positioned from curb portion 18b of holder projection 18 second width W2 with stylus 20 being coupled between front side 14b of container portion 14 and with curb portion 18b of holder projection 18.

Figure 12:
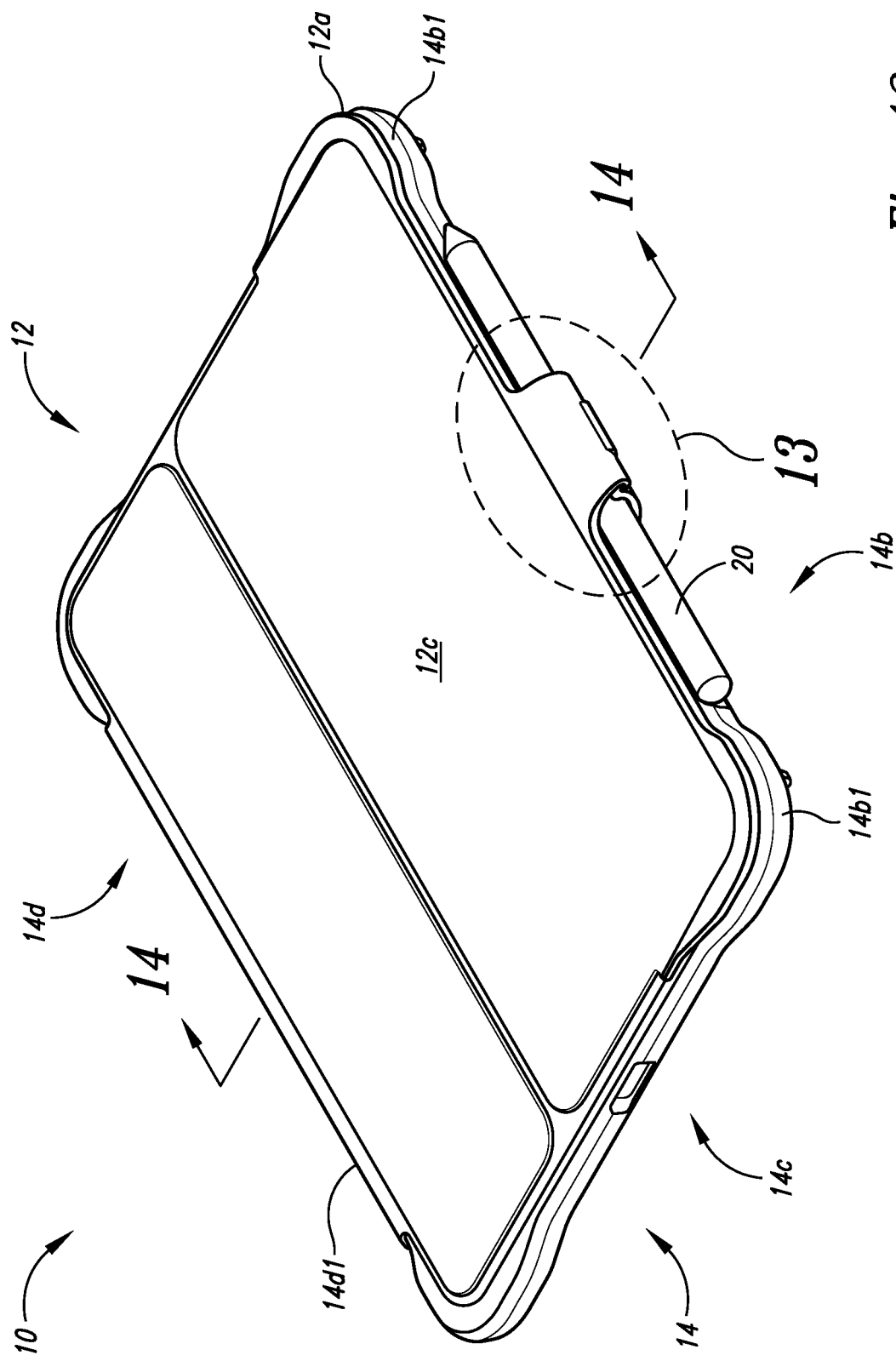
FIG. 12 is an anterior perspective view of a case assembly for the portable electronic computing device of FIG. 1 with case assembly cover closed shown holding a stylus.

Turning to FIG. 12, depicted therein is an anterior perspective view of a case assembly for the portable electronic computing device of FIG. 1 with case assembly cover closed shown holding a stylus.

Turning to FIG. 13, depicted therein is an enlarged side-elevational view of a dashed-circle portion of the case assembly label "13" shown in FIG. 12.

Turning to FIG. 14, depicted therein is a cross-sectional side-elevational view of the case assembly taken along the 14-14 cut line of FIG. 12.

Turning to FIG. 15, depicted therein is an enlarged side elevational view of a dashed-circle portion of the case assembly labeled "15" shown in FIG. 14. The restraint projection 16 is shown coupled with holder projection 18, projection 16e of restraint projection 16 is positioned across second gap distance G2 from curb portion 18b of holder projection 18 and interior backwall surface 16h of restraint projection 16 is in physical contact with exterior tip face portion 18f of tip portion 18c of holder projection 18 while stylus 20 is coupled between elongated recess 14b4 of front side 14b of container portion 14 and side receiving surface 18e of curb portion 18b of holder projection 18.

Figure 16:
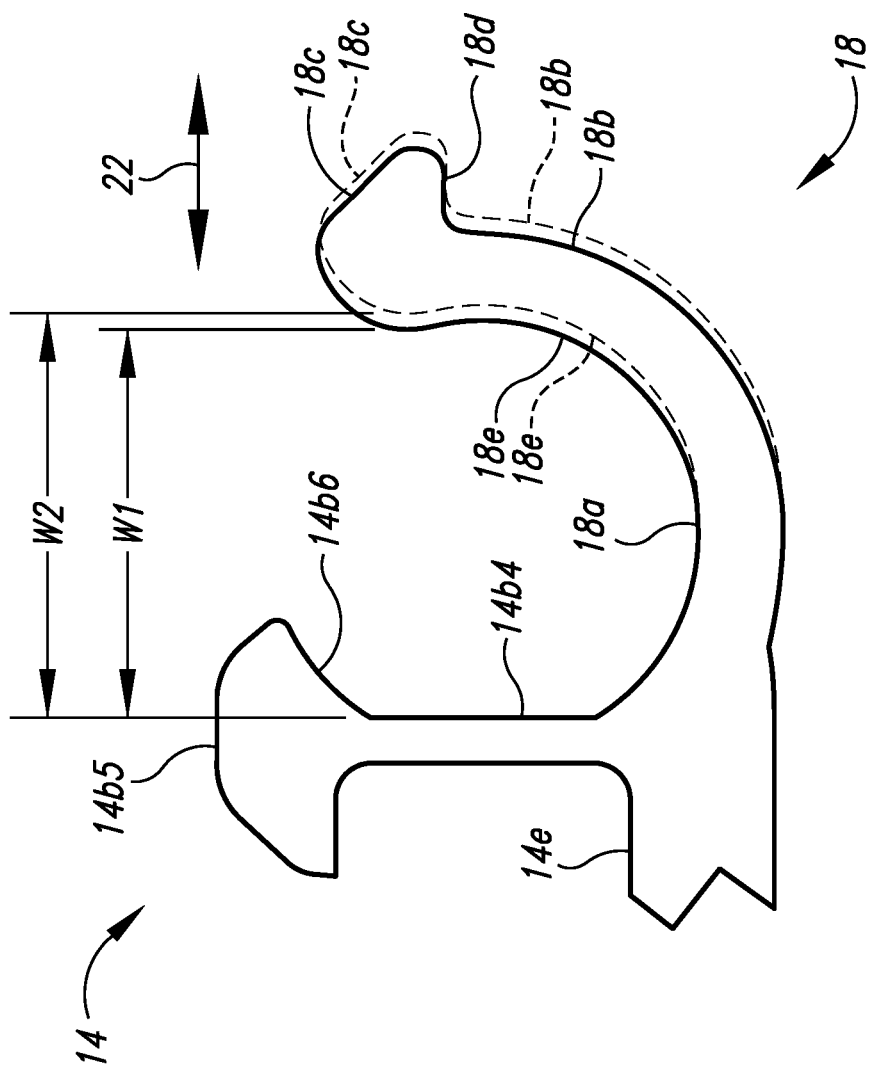
FIG. 16 is an enlarged side elevational view of a portion of case assembly.

Turning to FIG. 16, depicted therein is an enlarged side elevational view of a portion of case assembly to show flexing according to movement arrow 22 of curb portion 18b of holder projection 18 between first width W1 in which no object is being coupled and second width W2 in which stylus 20 is being coupled between curb portion 18b of holder projection 18 and elongated recess 14b4 of front side 14b of container portion 14.

Turning to FIG. 17, depicted therein is a side elevational view of the case assembly for the portable electronic computing device of FIG. 1 with case assembly cover closed.

Turning to FIG. 18, depicted therein is an enlarged side elevational view of a dashed-circle portion of the case assembly labeled "18" shown in FIG. 17.

Turning to FIG. 19, depicted therein is an enlarged side elevational view of a dashed-circle portion of the case assembly labeled "19" shown in FIG. 17.

Turning to FIG. 20, depicted therein is a side elevational view of the case assembly for a portable electronic computing device of FIG. 1 with case assembly cover closed.

Turning to FIG. 21, depicted therein is an enlarged side elevational view of a dashed-circle portion labeled "8" shown in FIG. 21.

Turning to FIG. 22, depicted therein is a side elevational view of the case assembly for the portable electronic computing device of FIG. 1 with case assembly cover closed shown holding a stylus.

Turning to FIG. 23, depicted therein is an enlarged side elevational view of a dashed-circle portion of the case assembly labeled "23" shown in FIG. 22.

Turning to FIG. 24, depicted therein is a side elevational view of the case assembly for a portable electronic computing device of FIG. 1 with case assembly cover closed shown holding a stylus.

Turning to FIG. 25, depicted therein is an enlarged side elevational view of a dashed-circle portion of the case assembly labeled "25" shown in FIG. 24.

As shown by one or more of FIGS. 1-25, implementations can include tablet case assembly 10, which can include (I) lid portion 12, which can include front edge 12b; (II) restraint projection 16 can extend from front edge 12b of lid portion 12; (III) container portion 14 can be hingedly coupled with lid portion 12 to provide a closed position and at least one open position for lid portion 12, container portion 14 can include front side 14b; and (IV) holder projection 18 extending outwardly away from front side 14b of container portion 14, wherein (A) when lid portion 12 is in at least one open position, holder projection 18 is uncoupled from restraint projection 16, and (B) when lid portion 12 is in closed position, holder projection 18 can be coupled with restraint projection 16 to secure lid portion 12 in closed position and to form an elongated open-ended enclosure bounded by a portion of front side 14b of container portion 14, at least a portion of restraint projection 16, and at least a portion of holder projection 18.

Implementations can include holder projection 18 coupling and uncoupling with restraint projection 16 through a clasping action.

Implementations can include holder projection 18 and restraint projection 16 being semiflexible to allow for coupling together.

Implementations can include holder projection 18, which can include ledge portion 18a, curb portion 18b, and tip portion 18c, ledge portion 18a can extend outwardly away from front side 14b of container portion 14, curb portion 18b can extend from ledge portion 18a opposingly positioned across from front side 14b of container portion 14, tip portion 18c can include exterior surface 18d, which can extend outwardly away from curb portion 18b in a direction away from front side 14b.

Implementations can include (i) restraint projection 16, which can include first exterior curvilinear surface 16a, second exterior curvilinear surface 16c, and end tip 16d with projection 16e, which can include interior end tip surface 16f, (ii) first exterior curvilinear surface 16a, which can extend outwardly away from front edge 12b of lid portion 12, (iii) second exterior curvilinear surface 16c, which can extend from first exterior curvilinear surface 16a to be angularly positioned relative to first exterior curvilinear surface 16a, (iv) end tip 16d can extend from second exterior curvilinear surface 16c, and (v) interior end tip surface 16f of projection 16e of end tip 16d can extend in a direction away from second exterior curvilinear surface 16c.

Implementations can include (i) when holder projection 18 and restraint projection 16 are coupled together, (a) interior end tip surface 16f of projection 16e of end tip 16d of restraint projection 16 can be contacting exterior surface 18d of tip portion 18c of holder projection 18.

Implementations can include (i) when (a) holder projection 18 and restraint projection 16 are coupled together, and (b) without an elongated member (e.g., stylus 20) being coupled with holder projection 18, (i) a portion of curb portion 18b of holder projection 18 can be spaced from projection 16e of end tip 16d of restraint projection 16 first gap distance G1, (ii) when (a) holder projection 18 and restraint projection 16 are coupled together, and (b) with elongated member (e.g., stylus 20) being coupled with holder projection 18, (i) portion of curb portion 18b of holder projection 18 can be spaced from projection 16e of end tip 16d of restraint projection 16 second gap distance G2, and (b) first gap distance G1 can be greater than second gap distance G2.

Implementations can include (i) tip portion 18c of holder projection 18, which can include exterior tip face portion 18f, (ii) end tip 16d of restraint projection 16, which can include interior backwall surface 16h, (iii) when (a) holder projection 18 and restraint projection 16 are coupled together, and (b) without an elongated member (e.g., stylus 20) being coupled with the holder projection 18, (i) exterior tip face portion 18f of tip portion 18c of holder projection 18 can be spaced from interior backwall surface 16h of end tip 16d of restraint projection 16 third gap distance G3 being nonzero, and (iv) when (a) holder projection 18 and restraint projection 16 are coupled together, and (b) with elongated member (e.g., stylus 20) being coupled with holder projection 18, (i) exterior tip face portion 18f of tip portion 18c of holder projection 18 can be in physical contact with interior backwall surface 16h of end tip 16d of restraint projection 16 third gap distance G3.

Implementations can include (i) a gap between a portion of front side 14b of container portion 14 and a portion of holder projection 18 can include a first width (e.g., first width W1) when front side 14b of container portion 14 and holder projection 18 are uncoupled from an elongated member (e.g. stylus 20), and (ii) the gap includes second width (e.g., second width W2) when front side 14b of container portion 14 and holder projection 18 are coupled with elongated member (e.g. stylus 20), and (iii) second width (e.g., second width W2) can be greater than first width (e.g., first width W1).

Implementations can include (i) when holder projection 18 is coupled with restraint projection 16 and when holder projection 18 is coupled with an elongated member (e.g. stylus 20), (a) a portion of holder projection 18 can be in physical contact with a portion of restraint projection 16, and wherein (ii) when holder projection 18 is coupled with restraint projection 16 and when holder projection 18 is uncoupled from elongated member (e.g. stylus 20), (a) the portion of holder projection 18 can be spaced from the portion of restraint projection 16.

Implementations can include a gap between a portion of front side 14b of container portion 14 and a portion of holder projection 18 can include a first width (e.g., first width W1), holder projection 18 can be semiflexible to enlarge the gap to a second width (e.g., second width W2) larger than the first width (e.g., first width W1) to couple with an elongated member (e.g. stylus 20) of the second width (e.g., second width W2).

Implementations can include a gap between a portion of front side 14b of container portion 14 and a portion of holder projection 18 can include a first diameter (e.g., first width W1), the holder projection 18 can be semiflexible to expand the gap to a second diameter (e.g., second width W2) to couple with an elongated member (e.g. stylus 20) of second width (e.g., second width W2).

Implementations can include a gap between a portion of front side 14b of container portion 14 and a portion of holder projection 18 can include a first span size (e.g., first width W1), holder projection 18 can be semiflexible to expand the gap to a second span size (e.g., second width W2) to couple with an elongated member (e.g. stylus 20) of the second width (e.g., second width W2).

Implementations can include wherein holder projection 18 can be semiflexible to expand the gap to the second span size (e.g., second width W2) to couple with the elongated member as stylus 20.

Implementations can include front side 14b of container portion 14 can includes elongated recess 14b4, which can include recess length L1 and wherein when front side 14b of container portion 14 and holder projection 18 are coupled with an elongated member (e.g. stylus 20), the widest portion of the elongated member (e.g. stylus 20) includes a second length (e.g., stylus length L2) less than or equal to recess length L1.

Implementations can include front side 14b of container portion 14, which can include elongated recess 14b4 wherein elongated recess 14b4 can include a deepest portion that can include recess length L1 to at least partially removably couple with an elongated member (e.g. stylus 20) including a second length (e.g., stylus length L2) less than or equal to recess length L1.

Implementations can include front side 14b of container portion 14, which can further include at least one tapered portion (e.g., taper 14b3), which can extend from elongated recess 14b4 to couple with at least one tapered portion of the elongated member (e.g. stylus 20).

Implementations can include restraint projection 16 being molded with lid portion 12 and wherein holder projection 18 can be molded with the container portion 14.

As shown by one or more of FIGS. 1-25, implementations can include tablet case assembly 10, which can include (I) lid portion 12, which can include front edge 12b; (II) restraint projection 16, which can extend from front edge 12b of lid portion 12; (III) container portion 14, which can be hingedly coupled with lid portion 12 to provide a closed position and at least one open position for lid portion 12, container portion 14 can include front side 14b; (IV) holder projection 18 can extend outwardly away from front side 14b of container portion 14; and (V) an elongated member (e.g., stylus 20), wherein (A) a gap between a portion of front side 14b of container portion 14 and a portion of the holder projection 18 can include a first width (e.g., first width W1), holder projection 18 can be semiflexible to expand the gap a second width (e.g., second width W2) to couple with the elongated member (e.g. stylus 20), portions of the elongated member (e.g. stylus 20) can include the second width (e.g., second width W2), (B) when lid portion 12 is in the at least one open position, holder projection 18 is uncoupled from restraint projection 16, and (C) when lid portion 12 is in the closed position, holder projection 18 is coupled with restraint projection 16 to secure lid portion 12 in the closed position and to form an elongated open-ended enclosure bounded by front side 14b of container portion 14, restraint projection 16, and holder projection 18.

As shown by one or more of FIGS. 1-25, implementations can include can include tablet case assembly 10, which can include (I) lid portion 12, which can include front edge 12b; (II) restraint projection 16, which can extend from front edge 12b of lid portion 12; (III) container portion 14 can be hingedly coupled with lid portion 12 to provide a closed position and at least one open position for lid portion 12, container portion 14 can include front side 14b; (IV) holder projection 18 can extend outwardly away from front side 14b of container portion 14; and (V) an elongated member (e.g., stylus 20), wherein (A) a gap between a portion of front side 14b of container portion 14 and a portion of holder projection 18 includes a first width (e.g., first width W1), holder projection 18 can be semiflexible to expand the gap a second width (e.g., second width W2) to removably couple with the elongated member (e.g. stylus 20), portions of the elongated member including the second width, (B) when lid portion 12 is in the at least one open position, holder projection 18 is uncoupled from restraint projection 16, and (C) when lid portion 12 is in the closed position, holder projection 18 is coupled with restraint projection 16 to secure lid portion 12 in the closed position when the elongated member is coupled in the gap between the portion of front side 14b of container portion 14 and the portion of holder projection 18 and when the elongated member is uncoupled from the gap between the portion of front side 14b of container portion 14 and the portion of holder projection 18.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A tablet case assembly comprising:
   (I) a lid portion including a front edge;
   (II) a restraint projection extending from the front edge of the lid portion;
   (III) a container portion hingedly coupled with the lid portion to provide a closed position and at least one open position for the lid portion, the container portion including a front side; and
   (IV) a holder projection extending outwardly away from the front side of the container portion, wherein
      (A) when the lid portion is in the at least one open position, the holder projection is uncoupled from the restraint projection, and
      (B) when the lid portion is in the closed position, the holder projection is coupled with the restraint projection to secure the lid portion in the closed position and to form an elongated open-ended enclosure bounded by a portion of the front side of the container portion, at least a portion of the restraint projection, and at least a portion of the holder projection wherein the holder projection includes a ledge portion, a curb portion, and a tip portion, the ledge portion extending outwardly away from the front side of the container portion, the curb portion extending from the ledge portion opposingly positioned across from the front side of the container portion, the tip portion including an exterior surface extending outwardly away from the curb portion in a direction away from the front side.

2. The tablet case assembly of claim 1 wherein
   (i) the restraint projection includes a first exterior curvilinear surface, a second exterior curvilinear surface, and an end tip with a projection including an interior end tip surface,
   (ii) the first exterior curvilinear surface extending outwardly away from the front edge of the lid portion,
   (iii) the second exterior curvilinear surface extending from the first exterior curvilinear surface to be angularly positioned relative to the first exterior curvilinear surface,
   (iv) the end tip extending from the second exterior curvilinear surface, and
   (v) the interior end tip surface of the projection of the end tip extending in a direction away from the second exterior curvilinear surface.

3. The tablet case assembly of claim 2 wherein
   (i) when the holder projection and the restraint projection are coupled together,
      (a) the interior end tip surface of the projection of the end tip of the restraint projection is contacting the exterior surface of the tip portion of the holder projection.

4. The tablet case assembly of claim 2 wherein
   (i) when
      (a) the holder projection and the restraint projection are coupled together, and
      (b) without an elongated member being coupled with the holder projection,
         (i) a portion of the curb portion of the holder projection is spaced from the projection of the end tip of the restraint projection a first gap distance,
   (ii) when
      (a) the holder projection and the restraint projection are coupled together, and
      (b) with the elongated member being coupled with the holder projection,
         (i) the portion of the curb portion of the holder projection is spaced from the projection of the end tip of the restraint projection the second gap distance, and
         (ii) the first gap distance being greater than the second gap distance.

5. The tablet case assembly of claim 2 wherein
   (i) the tip portion of the holder projection includes an exterior tip face portion,
   (ii) the end tip of the restraint projection includes an interior backwall surface,
   (iii) when
      (a) the holder projection and the restraint projection are coupled together, and
      (b) without an elongated member being coupled with the holder projection,
         (i) the exterior tip face portion of the tip portion of the holder projection is spaced from the interior backwall surface of the end tip of the restraint projection a third gap distance being nonzero, and
   (iv) when
      (a) the holder projection and the restraint projection are coupled together, and
      (b) with the elongated member being coupled with the holder projection,
         (i) the exterior tip face portion of the tip portion of the holder projection is in physical contact with the interior backwall surface of the end tip of the restraint projection.

6. A tablet case assembly comprising:
(I) a lid portion including a front edge;
(II) a restraint projection extending from the front edge of the lid portion;
(III) a container portion hingedly coupled with the lid portion to provide a closed position and at least one open position for the lid portion, the container portion including a front side; and
(IV) a holder projection extending outwardly away from the front side of the container portion, wherein
 (A) when the lid portion is in the at least one open position, the holder projection is uncoupled from the restraint projection, and
 (B) when the lid portion is in the closed position, the holder projection is coupled with the restraint projection to secure the lid portion in the closed position and to form an elongated open-ended enclosure bounded by a portion of the front side of the container portion, at least a portion of the restraint projection, and at least a portion of the holder projection wherein
 (i) a gap between a portion of the front side of the container portion and a portion of the holder projection includes a first width when the front side of the container portion and the holder projection are uncoupled from an elongated member, and
 (ii) the gap includes a second width when the front side of the container portion and the holder projection are coupled with the elongated member, and
 (iii) the second width being greater than the first width.

7. A tablet case assembly comprising:
(I) a lid portion including a front edge;
(II) a restraint projection extending from the front edge of the lid portion;
(III) a container portion hingedly coupled with the lid portion to provide a closed position and at least one open position for the lid portion, the container portion including a front side; and
(IV) a holder projection extending outwardly away from the front side of the container portion, wherein
 (A) when the lid portion is in the at least one open position, the holder projection is uncoupled from the restraint projection, and
 (B) when the lid portion is in the closed position, the holder projection is coupled with the restraint projection to secure the lid portion in the closed position and to form an elongated open-ended enclosure bounded by a portion of the front side of the container portion, at least a portion of the restraint projection, and at least a portion of the holder projection wherein a gap between a portion of the front side of the container portion and a portion of the holder projection includes a first width, the holder projection being semiflexible to enlarge the gap to a second width larger than the first width to couple with an elongated member including the second width.

8. The tablet case assembly of claim 7 wherein the holder projection couples and uncouples with the restraint projection through a clasping action.

9. A tablet case assembly comprising:
(I) a lid portion including a front edge;
(II) a restraint projection extending from the front edge of the lid portion;
(III) a container portion hingedly coupled with the lid portion to provide a closed position and at least one open position for the lid portion, the container portion including a front side; and
(IV) a holder projection extending outwardly away from the front side of the container portion, wherein
 (A) when the lid portion is in the at least one open position, the holder projection is uncoupled from the restraint projection, and
 (B) when the lid portion is in the closed position, the holder projection is coupled with the restraint projection to secure the lid portion in the closed position and to form an elongated open-ended enclosure bounded by a portion of the front side of the container portion, at least a portion of the restraint projection, and at least a portion of the holder projection wherein a gap between a portion of the front side of the container portion and a portion of the holder projection includes a first diameter, the holder projection being semiflexible to expand the gap to a second diameter to couple with an elongated member of the second width.

10. The tablet case assembly of claim 9 wherein the holder projection and the restraint projection are semiflexible to allow for coupling together.

11. A tablet case assembly comprising:
(I) a lid portion including a front edge;
(II) a restraint projection extending from the front edge of the lid portion;
(III) a container portion hingedly coupled with the lid portion to provide a closed position and at least one open position for the lid portion, the container portion including a front side; and
(IV) a holder projection extending outwardly away from the front side of the container portion, wherein
 (A) when the lid portion is in the at least one open position, the holder projection is uncoupled from the restraint projection, and
 (B) when the lid portion is in the closed position, the holder projection is coupled with the restraint projection to secure the lid portion in the closed position and to form an elongated open-ended enclosure bounded by a portion of the front side of the container portion, at least a portion of the restraint projection, and at least a portion of the holder projection wherein a gap between a portion of the front side of the container portion and a portion of the holder projection includes a first span size, the holder projection being semiflexible to expand the gap to a second span size to couple with an elongated member including the second width.

12. The tablet case assembly of claim 11 wherein
(i) when the holder projection is coupled with the restraint projection and when the holder projection is coupled with an elongated member,
 (a) a portion of the holder projection is in physical contact with a portion of the restraint projection, and wherein
(ii) when the holder projection is coupled with the restraint projection and when the holder projection is uncoupled from the elongated member,
 (a) the portion of the holder projection is spaced from the portion of the restraint projection.

13. The tablet case assembly of claim 11 wherein the holder projection being semiflexible to expand the gap to the second span size to couple with the elongated member as a stylus.

14. A tablet case assembly comprising:
(I) a lid portion including a front edge;
(II) a restraint projection extending from the front edge of the lid portion;
(III) a container portion hingedly coupled with the lid portion to provide a closed position and at least one open position for the lid portion, the container portion including a front side; and
(IV) a holder projection extending outwardly away from the front side of the container portion, wherein
  (A) when the lid portion is in the at least one open position, the holder projection is uncoupled from the restraint projection, and
  (B) when the lid portion is in the closed position, the holder projection is coupled with the restraint projection to secure the lid portion in the closed position and to form an elongated open-ended enclosure bounded by a portion of the front side of the container portion, at least a portion of the restraint projection, and at least a portion of the holder projection wherein the front side of the container portion includes an elongated recess including a recess length and wherein when the front side of the container portion and the holder projection are coupled with an elongated member, a wide portion of the elongated member includes a second length less than or equal to the recess length.

15. A tablet case assembly comprising:
(I) a lid portion including a front edge;
(II) a restraint projection extending from the front edge of the lid portion;
(III) a container portion hingedly coupled with the lid portion to provide a closed position and at least one open position for the lid portion, the container portion including a front side; and
(IV) a holder projection extending outwardly away from the front side of the container portion, wherein
  (A) when the lid portion is in the at least one open position, the holder projection is uncoupled from the restraint projection, and
  (B) when the lid portion is in the closed position, the holder projection is coupled with the restraint projection to secure the lid portion in the closed position and to form an elongated open-ended enclosure bounded by a portion of the front side of the container portion, at least a portion of the restraint projection, and at least a portion of the holder projection wherein the front side of the container portion includes an elongated recess wherein the elongated recess includes a deep portion that includes a recess length to at least partially removably couple with an elongated member including a second length less than or equal to the recess length.

16. The tablet case assembly of claim 15 wherein the front side of the container portion further includes at least one tapered portion extending from the elongated recess to couple with at least one tapered portion of the elongated member.

17. A tablet case assembly comprising:
(I) a lid portion including a front edge;
(II) a restraint projection extending from the front edge of the lid portion;
(III) a container portion hingedly coupled with the lid portion to provide a closed position and at least one open position for the lid portion, the container portion including a front side;
(IV) a holder projection extending outwardly away from the front side of the container portion; and
(V) an elongated member,
wherein
  (A) a gap between a portion of the front side of the container portion and a portion of the holder projection includes a first width, the holder projection being semiflexible to expand the gap a second width to couple with the elongated member, portions of the elongated member including the second width,
  (B) when the lid portion is in the at least one open position, the holder projection is uncoupled from the restraint projection, and
  (C) when the lid portion is in the closed position, the holder projection is coupled with the restraint projection to secure the lid portion in the closed position and to form an elongated open-ended enclosure bounded by the front side of the container portion, the restraint projection, and the holder projection.

18. A tablet case assembly comprising:
(I) a lid portion including a front edge;
(II) a restraint projection extending from the front edge of the lid portion;
(III) a container portion hingedly coupled with the lid portion to provide a closed position and at least one open position for the lid portion, the container portion including a front side;
(IV) a holder projection extending outwardly away from the front side of the container portion; and
(V) an elongated member,
wherein
  (A) a gap between a portion of the front side of the container portion and a portion of the holder projection includes a first width, the holder projection being semiflexible to expand the gap a second width to removably couple with the elongated member, portions of the elongated member including the second width,
  (B) when the lid portion is in the at least one open position, the holder projection is uncoupled state from the restraint projection, and
  (C) when the lid portion is in the closed position, the holder projection is coupled with the restraint projection to secure the lid portion in the closed position when the elongated member is coupled in the gap between the portion of the front side of the container portion and a portion of the holder projection and when the elongated member is uncoupled from the gap between the portion of the front side of the container portion and a portion of the holder projection.

* * * * *